(12) United States Patent
Smith

(10) Patent No.: US 6,502,076 B1
(45) Date of Patent: Dec. 31, 2002

(54) SYSTEM AND METHODS FOR DETERMINING AND DISPLAYING PRODUCT PROMOTIONS

(75) Inventor: Derek R. Smith, Atlanta, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/323,603

(22) Filed: Jun. 1, 1999

(51) Int. Cl.⁷ ............................................... G06F 17/60
(52) U.S. Cl. ............................ 705/14; 705/26; 705/10; 707/10
(58) Field of Search ............................ 705/26, 27, 14, 705/10, 66; 709/219; 707/10

(56) References Cited

U.S. PATENT DOCUMENTS

| | | | | |
|---|---|---|---|---|
| 5,392,066 A | * | 2/1995 | Fisher et al. | 725/66 |
| 5,949,411 A | * | 9/1999 | Doerr et al. | 345/716 |
| 5,966,696 A | * | 10/1999 | Giraud | 705/14 |
| 6,177,880 B1 | * | 1/2001 | Begum | 340/825.35 |
| 6,185,610 B1 | * | 2/2001 | Nagatomo et al. | 709/219 |
| 6,279,036 B1 | * | 8/2001 | Himmel et al. | 709/24 |
| 6,282,516 B1 | * | 8/2001 | Giuliani | 705/14 |
| 6,321,209 B1 | * | 11/2001 | Pasquali | 705/14 |
| 6,323,753 B2 | * | 11/2001 | Begum | 705/14 |
| 6,366,914 B1 | * | 4/2002 | Stern | 707/10 |
| 2001/0044832 A1 | * | 11/2001 | Cohn et al. | 709/217 |

FOREIGN PATENT DOCUMENTS

| | | | | |
|---|---|---|---|---|
| EP | 749081 | * | 12/1996 | |
| EP | 0 749 081 A1 | * | 12/1996 | G06F/17/60 |
| EP | 0 749 081 B1 | * | 11/1998 | G06F/17/30 |
| WO | WO 99/08216 | * | 2/1999 | G06F/17/60 |

OTHER PUBLICATIONS

Yumiko, Ono "Wal–Mart Uses TV–Set Displays For Ad Network", Wall Street Journal; New York; Oct 7, 1997, Eastern edition, "Advertising", Starting p. B1 extracted on Internet on Dec. 14, 2001 from Proquest database: http://proquest.umi.com/.*

Emily Nelson, "Rretailing: Wal–Mart's Garth–Quake May Spur Sales", Wall Street Journal; New York; Novt 2, 1998, Eastern edition, "Advertising", Starting p. B1 extracted on Internet on Dec. 14, 2001 from Proquest database: http://proquest.umi.com/.*

Lubove, Seth, "A familiar tune," Forbes, Nov. 20, 1995. vol. 156 Issue 12, p158, 1p, 2c extracted on Internet on Dec. 14, 2001 from Proquest database: http://proquest.umi.com/.*

Press Release, " Lycos and ©West Coast Entertainment Announce Marketing Alliance; Includes Joint Online Promotions and Extensive In–Store Marketing", Business Wire; New York; May 19, 1999 extracted on Internet on Jun. 23, 2002 from Proquest database: http:/.*

* cited by examiner

Primary Examiner—Wynn W. Coggins
Assistant Examiner—Yogesh C Garg
(74) Attorney, Agent, or Firm—Priest & Goldstein, PLLC (57) ABSTRACT

A product promotion display system comprises a server computer hosting a network of terminals, each terminal having a display for displaying advertisements and product promotion information to a customer. The server computer has access to a product promotion database containing data to be used in assembling advertisements and product promotion information to be displayed on one or more of the terminals. A product promotion software object executed by the server computer accesses the database in order to retrieve data therefrom to be used in assembling advertisements and product promotion information to be displayed on one or more of the terminals. A user interface connected to the terminals and to the promotion software object causes the assembled advertisements and product promotion information to be displayed on one or more of the terminals.

30 Claims, 5 Drawing Sheets

SYSTEM AND METHODS FOR DETERMINING AND DISPLAYING PRODUCT PROMOTIONS

BACKGROUND OF THE INVENTION

1. Field of the Invention

The present invention relates generally to improvements to in-store retail service terminals, and more particularly to advantageous aspects of a system and methods for using in-store retail service terminals to display promotions and collect promotion data.

2. Description of the Prior Art

At present, there is no integrated system for retailers to display product promotions. Rather, a typical retail establishment relies on an assortment of signs, placards, standing cardboard displays, leaflets and other promotional materials positioned throughout the store to provide promotional information to customers. This approach suffers from a number of disadvantages. First, it is difficult to present the promotional information to the customers in a coordinated and effective manner. Further, it is a cumbersome process to update or rearrange the promotional information, as may be required. In addition, the lack of an integrated system means that it is virtually impossible for a retailer to accumulate any kind of meaningful statistical data relating to the promotional information being displayed. The absence of these data makes it difficult for a retailer to determine the amount of money to be charged for each promotion.

There is thus a need for an automated system for displaying product promotion information to in-store retail customers in a coordinated and effective manner, and for accumulating statistical data relating to the display of the information.

SUMMARY OF THE INVENTION

The present invention provides a product promotion display system, comprising a server computer hosting a network of terminals, each terminal having a display for displaying advertisements and product promotion information to a customer. The server computer has access to a product promotion database containing data to be used in assembling advertisements and product promotion information to be displayed on one or more of the terminals. A product promotion software object executed by the server computer accesses the database in order to retrieve data therefrom to be used in assembling advertisements and product promotion information to be displayed on one or more of the terminals. A user interface connected to the terminals and to the promotion software object causes the assembled advertisements and product promotion information to be displayed on one or more of the terminals.

Additional features and advantages of the present invention will become apparent by reference to the following detailed description and accompanying drawings.

DETAILED DESCRIPTION

The present invention enables retailers to display sales promotions to customers throughout a retail establishment using a network of retail self-service terminals. In one embodiment of the invention, each terminal is provided with Web browser software. The network server computer is provided with Web server software. Retailers provide custom advertising content in the form of Web pages that are displayed on terminal touch-screen displays. The ads appearing on these pages can promote anything about the store, such as in store products, sale items, the store itself, and so forth. When a terminal is idle, it displays a sequence of promotions called an "attract loop." An attract loop cycles through a specified series of advertisements, instructions, or other content to attract the customer to use the retail self-service terminal.

In addition, the present invention allows retailers to collect promotion data, which includes: (1) how long each advertisement has been displayed within a specific date/time slot; (2) the number of times each advertisement has been displayed within a specific date/time slot; and (3) the number of times a customer interacts with each advertisement. This data provides different options to a retailer for charging vendors for advertisement costs. For example, a retailer can charge according to how long the advertisement is displayed, when the advertisement is displayed, or a combination of both. A retailer can also charge according to how many times each advertisement is guaranteed to be seen by customers.

While a sequence of advertisements is running, the customer touches a designated area of a terminal's touch-screen display to terminate the sequence and ready the terminal for use. The designated area includes the advertisement itself or, alternatively, a navigation button. When the advertisement sequence has been terminated, the customer is presented with a default home page for the given terminal or, alternatively, a screen related to the choice the consumer has selected on the screen. This could be, for example, a screen that displays additional information about the promotion that was being displayed, or a new product category.

All sequences start automatically when a user makes a selection or, in the case of the attract loop, when the retail terminal becomes idle. The attract loop starts automatically based upon the configurable idle times for each designated group of retail self-service terminals.

When the present invention is installed, it is configured by the retailer, who configures: (1) retail terminal device groups; (2) advertisement information; (3) advertisement group information; and (4) time schedules.

The device group configuration enables a retailer to place related devices into groups. The grouped devices can be related, for example, by location or department. Device groups enable a retailer to quickly define the content that should be displayed on related devices.

The retailer can add, update, and delete information about advertisements in the retail self-service terminal database. Adding information about an advertisement consists of specifying: (1) a description of the advertisement; (2) a time value, in seconds, that defines how long the ad should appear; (3) a uniform resource locator (URL) defining the content that appears when a consumer interacts with the ad that is displayed; (4) a weighting factor that is used to determine the number of successive times the ad should be displayed within an attract loop; (5) a URL defining the actual advertisement content; and (6) an advertisement media type (for example, GIF image, MPEG video, ASF streaming video, and so forth).

In a preferred embodiment of the invention, all of the advertisements are maintained independently, which allows advertisements to be created independently and later grouped together to form "ad groups." This enables advertisements to be reused within multiple ad groups and for ad groups to repeat the same advertisement multiple times. Once the device groups and advertisements are defined, the retailer can define advertisement groups that act as sequences. For added convenience, the present invention delivers a set of predefined ad groups. The retailer can modify these predefined groups in the same manner as other ad groups defined by the retailer.

The function of configuring ad groups comprises specifying: (1) a description for each ad group; (2) the advertisements that make up each ad group; (3) how the advertisements are ordered; (4) how to initiate the ad group (always from the beginning or from where it was last terminated); (5) a default duration for each advertisement to be displayed; (6) how often instructional content displays while the sequence is running; (7) how to interpret the instructional content frequency value, i.e., as a function of time (for example, displaying the instructional content every 30 seconds) or as a function of the ads in the group (for example, displaying the instruction content after every five ads); (8) the navigation context for each ad group.

In addition, the retailer can specify a time schedule for the advertisement group and can also specify the order in which the ads in the group are displayed using one of two ordering options, either explicit ordering or random ordering.

Each ad group can be configured to run independently on any of the retail self-service terminals. Conversely, each device can be configured to run any number of different ad groups. These two options enable retailers to tailor the promotional content and to define when that content is displayed for different areas of the store. For example, a retailer can decide to run a sequence of cereal promotions on the retail self-service terminals located in the cereal aisle on a Saturday morning in order to appeal to children shopping with their parents on the weekends.

Each sequence of advertisements consists of logical groups of ads as defined by the retailer. A retailer can specify a time schedule for displaying each advertisement group. A single ad group can be scheduled differently for each device on which it is run.

Back office or enterprise-level personnel can develop customer advertising and instructional content to be displayed as part of each sequence of advertisements. The advertising and instructional content is independent of the product promotion component. Content developers can use any content development tool they choose.

The advertising and instruction content are stored as regular files on the internet information server. This content can consist of any type of data that can be rendered, either natively or through support plug-ins, by the Web browser.

Because advertisements are maintained independently from ad groups, each ad group can consist of promotions of different promotion content types. For example, a given ad group may consist of one HTML advertisement, one static image advertisement, and one digital video advertisement. The present invention includes a set of advertising and instruction content templates that assist developers in their content development by providing sizing and style guidelines.

Figure 1:
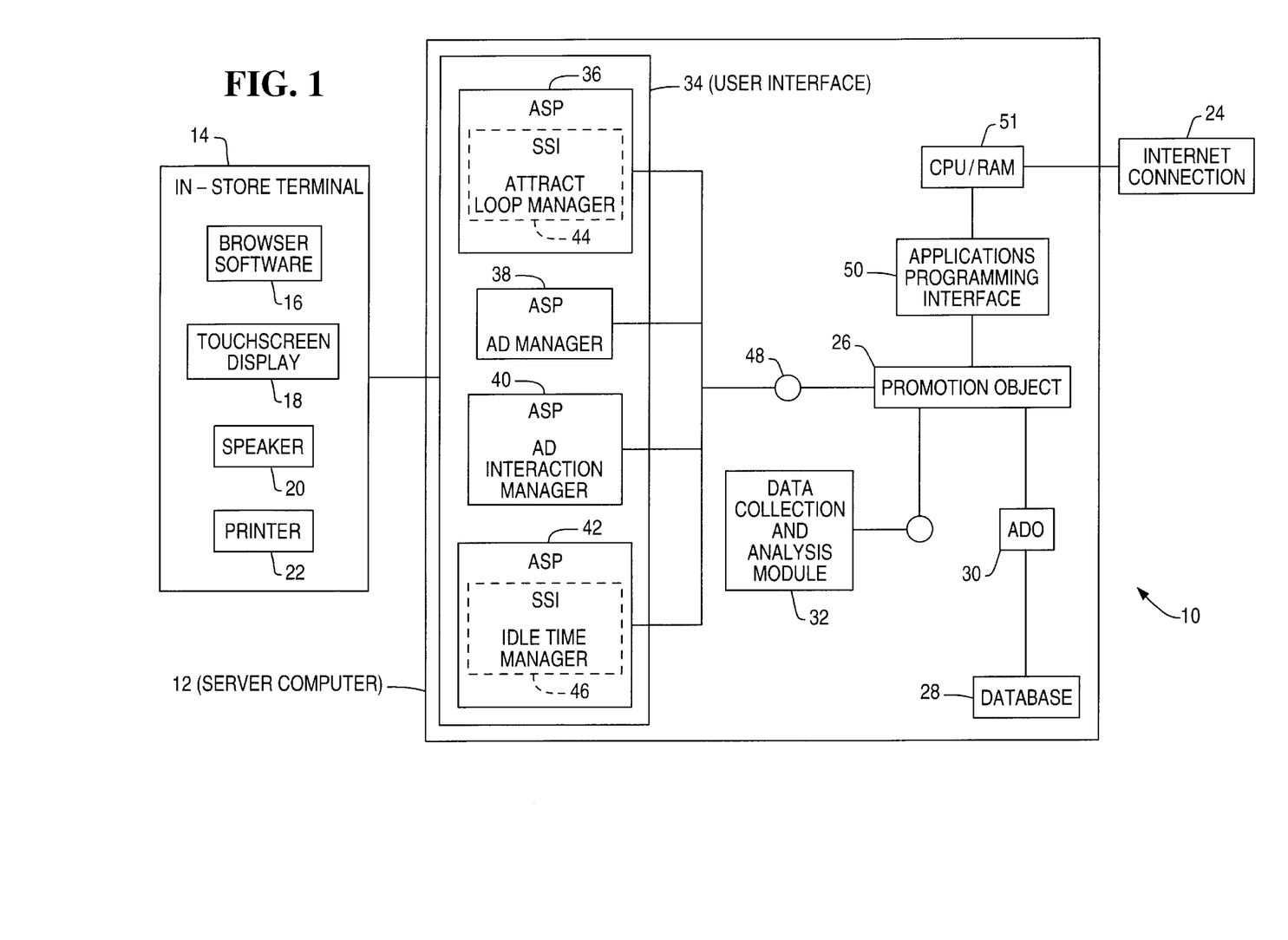
FIG. 1 is a diagram of the components of a system according to the invention.

FIG. 1 shows a diagram of a presently preferred embodiment of a system 10 incorporating the invention. As shown in FIG. 1, the system 10 comprises a server computer 12 that hosts a network of in-store terminals 14. The in-store terminals in the present embodiment comprise small-footprint PCs located throughout a retail establishment. Each in-store terminal 14 runs Web browser software 16, and is provided with a touch-screen display 18, speaker 20, and printer 22. The touch-display screen 18 displays text, graphics, and video images as an output to a retail customer, accompanied by an audio input, such as a voice recording or music, at speaker 20. The retail customer provides inputs to the touch-screen display 18 by touching indicated areas of the screen display that function as buttons. As described further below, the touch-screen display 18 is divided into a number of distinct regions providing different functions of the present invention. Additional input and output devices may be added to the system 10, as desired. Further, although the present embodiment makes use of in-store terminals, it would be within the spirit of the invention for the system to work with off-site PCs that are connected into the network by the internet or other means of remote access 24, so that a potential customer or store employee can obtain product promotions remotely.

The server computer 12 includes a product promotion software object 26 (hereinafter referred to as the "promotion object"), which allows users of the object to retrieve the appropriate ad groups based on some set of criteria, for example, device identifier, current date and time, etc. In the present invention, the promotion object 26 is implemented in the form of a component object model (COM) object that includes interfaces to other software components, as described below.

The product promotion data required by the promotion module are stored in a database 28 that is compliant with Microsoft's Open Database Connectivity (ODBC) standard. The database 28 is accessed by promotion object 26 by means of Microsoft's Active Data Objects (ADO) 30. This set of objects allows Active Server Pages, discussed below, to seamlessly connect to any ODBC data source and manipulate the data therein.

The promotion object 26 interfaces with a data collection and analysis module 32 to perform statistical data collection, as well as debug tracing. The present embodiment of the invention uses the data collection and analysis module 30 and Active Server Pages to collect the following data:

1. Statistical Data

The following tallies are recorded in the database by the present embodiment of the invention:

Ad display time: The total amount of time each ad is displayed within each ad group. This data can be used to track how long each ad was displayed within a specific date/time slot. It could prove useful to allow retailers to charge vendors for advertising time.

Ad display tally: The total number of times each ad has been displayed. This data may offer an alternative approach to charging vendors for advertising time.

Ad interaction tally: The total number of times a consumer has interacted with each ad. This data gives retailers a quick view of which ads are being interacted with the most.

2. Detailed Transaction Log

The Ad Hit log is recorded in the detailed transaction log files by the Product Promotion/Attract Loop module. The Ad Hit log lists when a consumer interacted with each ad. A consumer interacts with an ad by either terminating the attract loop while that ad is being displayed (via the user interface navigational buttons) or touching an ad while it is being displayed by the user interface.

The Ad Hit log maintains the following data: date and time of when each ad interaction occurred; identifier of the user who interacted with the ad; identifier of the device on which the ad was displayed; identifier of the ad that was interacted with; and the URL of the page that was displayed as a result of the ad interaction.

Retailers can use this data to determine which advertisements were guaranteed to be seen by a consumer. This log may be enhanced to track who interacted with the ad. This information can be gathered when a consumer swipes an identification card (for example, a frequent shopper card) through a magnetic stripe reader (MSR) at a retail self-service terminal or other device.

The present embodiment further provides a user interface 34 that provides an interface between the promotion object 26 and the in-store terminals 14. The user interface 34 is implemented by Microsoft's Active Server Page (ASP) engine, which works in conjunction with the Web server software used by the server computer to complete all server-side processing. These tasks include retrieving Hypertext Transfer Protocol (HTTP) request header information from the Web server, some database accesses, and all logic used to build the necessary client-side JavaScript code to process each attract loop.

On the client side, all of the JavaScript code generated by the Active Server Pages requires access to an object model of the platform Web browser. This object model allows any supported scripting language to control the browser from the inside out. The present embodiment of the invention uses this model to access various properties of the platform Web browser.

As shown in FIG. 1, the user interface 34 comprises Active Server Pages (ASPs) 36, 38, 40, 42, which are generated by Microsoft's Active Server Page engine. An ASP is a dynamically created Web pages containing either Visual Basic or Jscript code. Thus, when the browser software 16 at an in-store terminal 14 requests an ASP page, the Web server software used by the server computer 12 generates a page with HTML code and sends it back to the browser 16 at the in-store terminal 14 for display to the retail customer.

In addition, certain of the ASPs used in the present embodiment make use of server-side include (SSI) files 44, 46. The use of SSI files allows the Web server software used by the server computer 12 to dynamically generate data for the ASP whenever it is required. In particular, the SSI's are used to execute programs and to insert the results obtained from the programs into the ASP before they are sent to the browser 16 at an in-store terminal 14. The particular SSIs used in the present embodiment of the invention are described in further detail below.

A promotion interface 48, discussed further below, is provided for connecting the promotion object 26 to the user interface 34.

The present embodiment of the invention uses event management for the promotion object, Active Server Pages, and SSI files. Any errors encountered by the software are logged through an applications programming interface (API) 50. In the present embodiment, the API 50 is provided by NCR Store Minder Universal API. Errors include the following: device not found; device group not found; specified ad group not found; ad groups scheduled without containing any ads; ad groups not found for specified navigational context; specified ad not found; internal database look-up errors; internal processing errors. Additional events to be logged may also be defined, as desired.

For all its timing mechanisms, the present invention uses standard timers accessible from the Web browser object model via JavaScript 1.0. These times are bundled with the platform Web browser.

Because of the technologies used to implement the product promotion module, the following software constraints exist: First, the Active Server Pages used by the product promotion module must be processed by a Web server that supports Active Server Pages. Second, the Web browser used to render all of the product promotion module Web pages must support JavaScript 1.0 or later, as well as the Web browser object model. No hardware constraints exist for the present embodiment of the invention. The present embodiment of the product promotion module uses standard TCP/IP and HTTP communication protocols.

As discussed above, the present embodiment of invention is based on two fundamental concepts: "ad" and "ad group." An ad is a promotion. Each ad includes some type of promotional media called "content." Retailers can develop custom ad content to be displayed on any retail self-service terminal. As discussed above, the present promotion display system is independent of the content used for each ad. Therefore, ad content developers can use any content development tools they choose to develop ads, so long as the developed content is supported by the platform Web browser.

Individual ads are grouped together to form ad groups. Ad groups provide a logical way to group one or more ads that should run together. Each ad can be included in one or more ad groups, making it possible for retailers to reuse their ads in various ad groups. In addition, any single ad can be repeated within any single ad group. Each ad group is assigned a time schedule dictating when it is eligible for display. The following ad group scheduling options are supported by the presently preferred embodiment of the invention: inclusive selection (where date and time define periods of eligibility); a range between two specific dates (specified as month, day, and year); a range between two specific times within a single day (specified as hour and minute); individual days of the week (Sunday, Monday, Tuesday, etc.).

As discussed above, each ad group can be configured to display independently on any retail self-service terminal. Conversely, each terminal device can be configured to display any number of different ad groups. These two options enable retailers to tailor their ads for specific areas of the store (for example, displaying ads for cereal in the cereal aisle). Each ad group can also be configured to have its included ads be displayed in a particular order or random order.

The present embodiment of the invention is divided into three areas of functionality: attract loop, instructional content, and product promotion. Each of these areas are described in greater detail immediately below.

An attract loop is a sequence of promotions, or ad groups, that is displayed at a self-service terminal 14 when it is idle. As discussed above, an attract loop cycles through a specified series of advertisements, instructions, or other content, in order to attract a customer to use the retail self-service terminal. An attract loop starts automatically when any terminal has been idle for a specified period of time.

Figure 2:
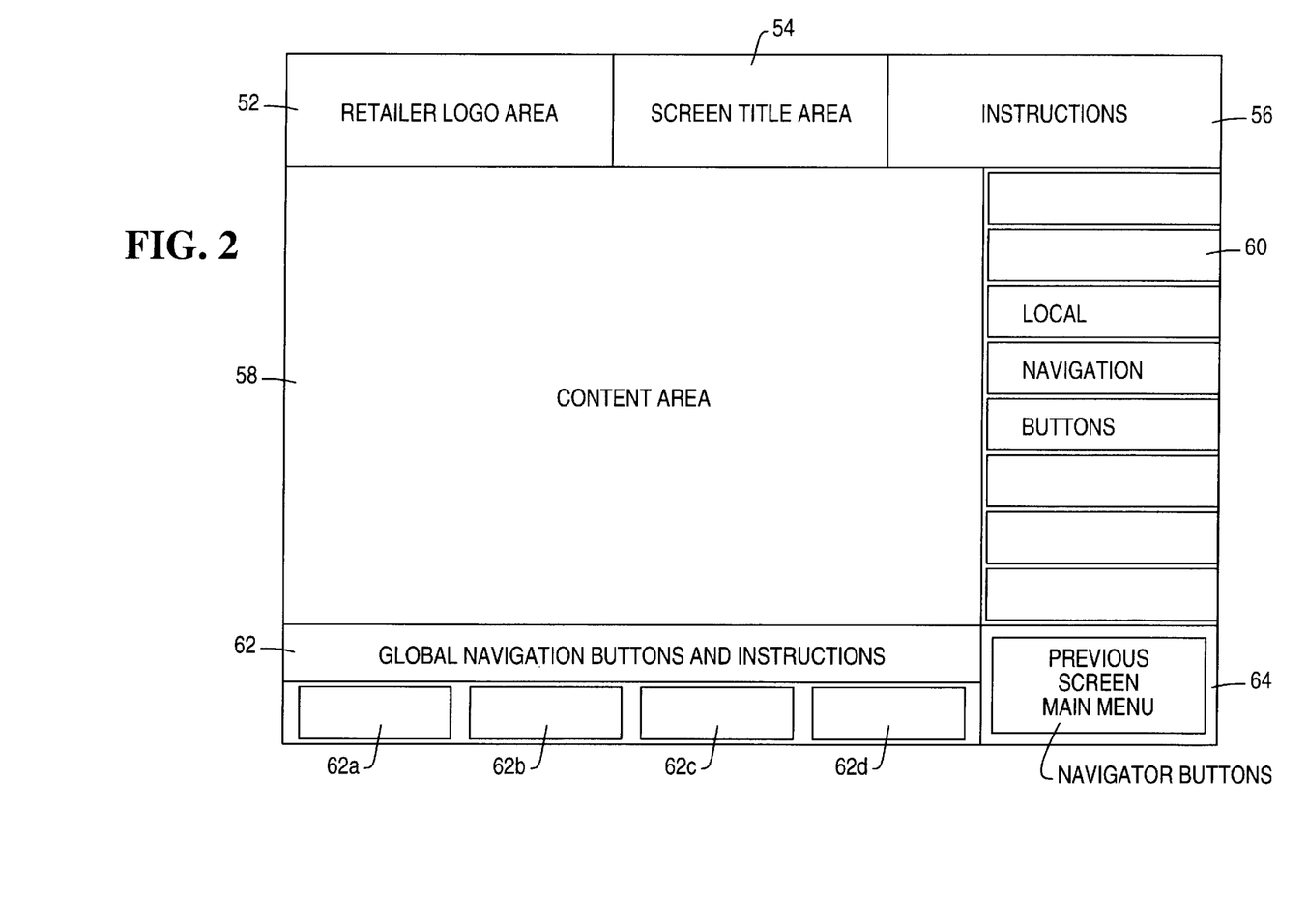
FIG. 2 is a screenshot of a touch-screen display that may advantageously be used with the system shown in FIG. 1.

FIG. 2 shows a screenshot of a touch-screen display 18 on a retail self-service terminal 14 according to the present embodiment of the invention. The display 18 includes seven distinct display regions: retailer logo area 52, screen title 54, instructions 56, content area 58, local navigation buttons 60, global navigation buttons and instructions 62 (including four sub-buttons, 62a–d), and previous screen/main menu navigation buttons 64.

An attract loop displays in two distinct regions of the touch-screen display 18, the content area 58 and the area dedicated to local navigation buttons 60. The content area 58 contains the currently running advertisement, while the local navigation area 60 contains navigational buttons that terminate the attract loop when the buttons are pressed. When a customer touches one of the navigation buttons or, optionally, the ad itself, the currently running attract loop terminates and the system displays a different screen.

Instructional content is automatically displayed in the content area 58 and in the local navigation area 60 as a part of each attract loop. Instructional content is designed to provide assistance in using the retail self-service terminal. Each instructional page is automatically displayed in each attract loop based on a configurable display frequency. In addition, instructional content is displayed when a terminal has gone idle and there are no scheduled ads.

In addition, the present system also offers services that can be used to provide product promotion functionality to any part of the retail self-service terminal system. This allows retailers to specify ad groups to display outside the context of the attract loop that can be viewed during non-idle times. In this case, each ad group is linked to the navigational context of the terminal. For example, if a consumer selects "VCR" as a product category, a group of advertisements or possibly a VCR sales flyer may be displayed to promote different brands of VCRs.

Figure 3:
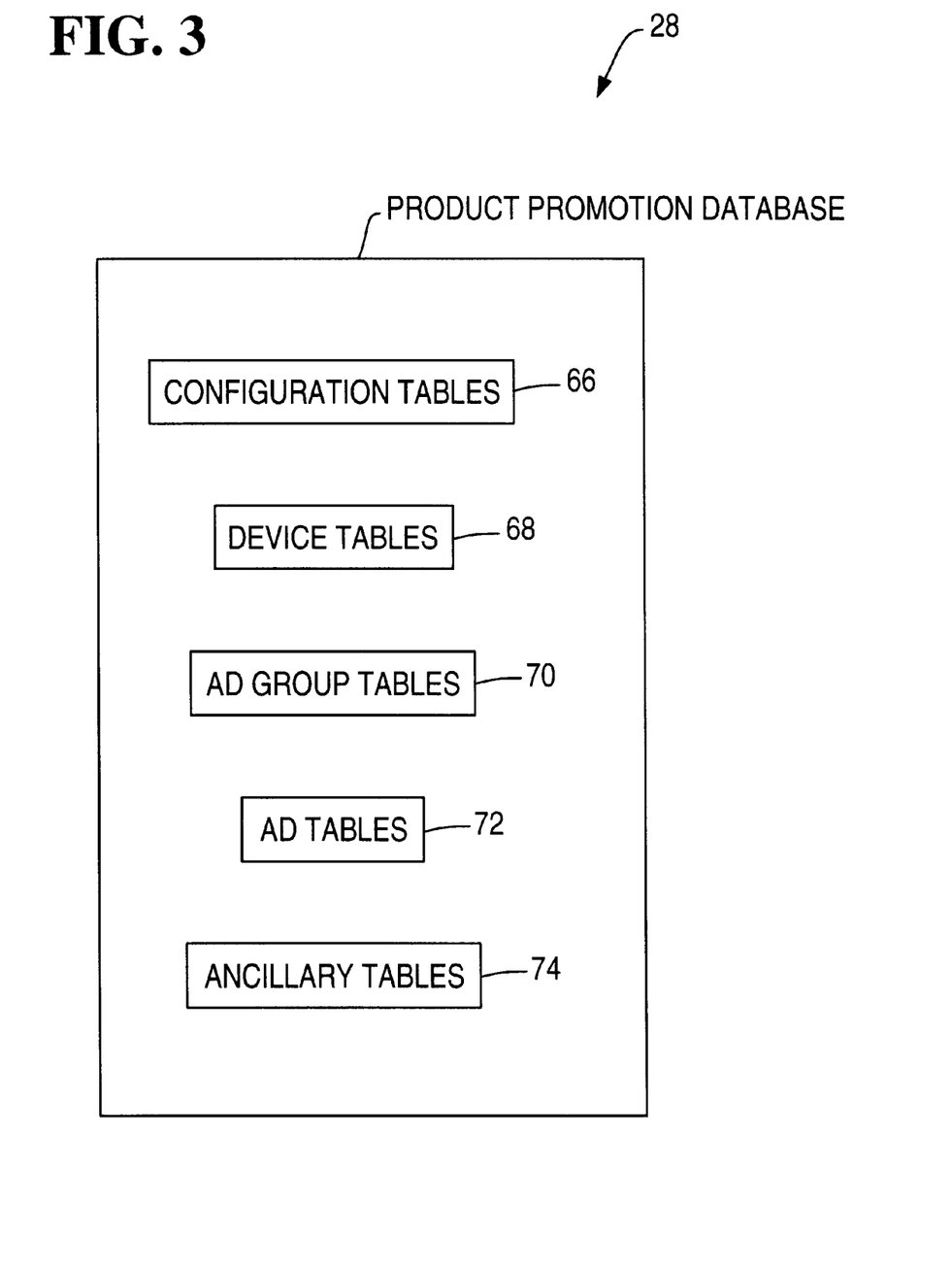
FIG. 3 is a diagram of a database for use with the system shown in FIG. 1.
Figure 4:
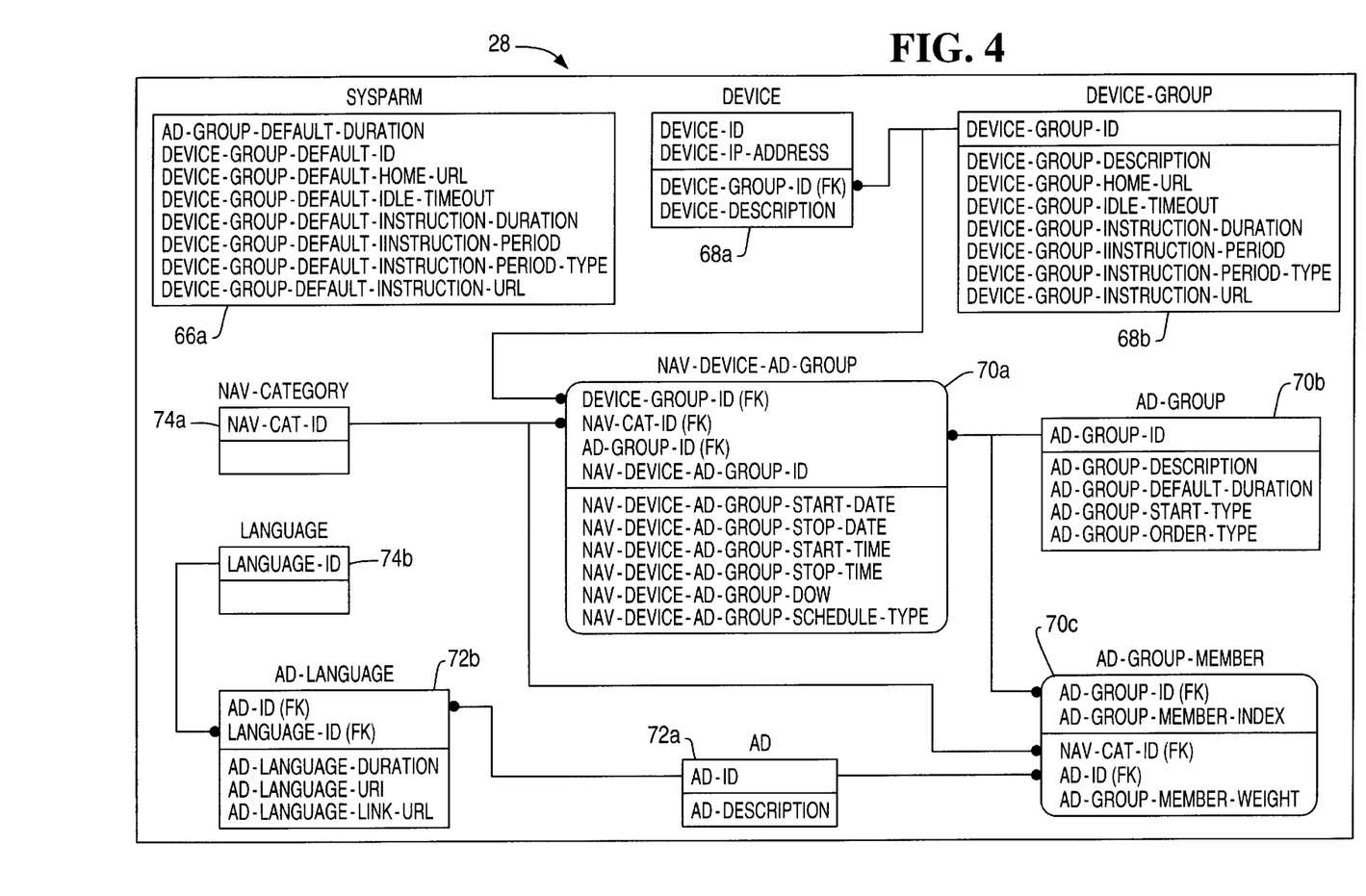
FIG. 4 is a more detailed diagram of the database shown in FIG. 3.

An important component of the present system is the product promotion database 28. FIG. 3 shows a diagram of the categories of database tables used to support the product promotion module: configuration tables 66, device tables 68, ad group tables 70, ad tables 72, and ancillary tables 74. FIG. 4 shows a more detailed diagram of the database tables shown in FIG. 3. The tables shown in FIG. 4 correspond to those shown in FIG. 3 as follows:

Configuration tables 66: Sysparm 66a

Device tables 68: Device 68a, Device-Group 68b

Ad group tables 70: Nav-Device-Ad-Group 70a, Ad-Group 70b, Ad-Group-Member 70c

Ad tables 72: Ad 72a, Ad-Language 72b

Ancillary tables 74: Nav-Category 74a, Language 74b

In FIG. 4, each box has a table name listed above it. Within each box, fields listed above the dividing line define the table's primary key. Other fields, listed below the dividing line, are attributes that can be looked up from the table using a valid primary key value. Fields followed by (FK) define values that can be used as keys into additional tables. Lines between tables convey the relationships between tables.

The database tables used by the Product Promotion/Attract Loop module are described briefly in the following subsections. In each table, the initial heading line gives the name of the table. Field names matching those in FIG. 4 appear down the left side of the table, with a description of the field to the right. A double line appears in the table as the dividing line between the fields comprising the table's primary key (above the double line) and attribute fields (below the double line).

Configuration Tables

The Sysparm configuration table 66a, illustrated in Table 1 below, stores all of the operating and configuration parameters for the Product Promotion/Attract Loop module. All of the device-group-default-XXX fields listed in the table provide the default values necessary for the promotion COM object to dynamically add a new group of system devices. When a query is made for a device that is not listed in the database, the promotion object automatically creates a new entry in the database for that device and it assigns the new device to the device group specified by the device-group-default-id field. If this device group does not already exist in the database, the promotion object automatically creates the device group using all of the device-group-default-XXX field values for the new group's attributes.

TABLE 1

Sysparm Database Table Definition
SYSPARM

| Field: | Description: |
|---|---|
| ad-group-default-duration | Default duration (in seconds) for all ads in new ad groups. |
| device-group-default-id | Integer value representing the default device group identifier for new devices. |
| device-group-default-home-url | String value representing the default start page URL for new device groups. |
| device-group-default-idle-timeout | Long integer value representing the default amount of idle time (in seconds) before an attract loop starts for new device groups. |
| device-group-default-instruction-duration | Long integer value representing the number of seconds to display instructional content for new device groups. |
| device-group-default-instruction-period | Long integer value representing how often (in number of seconds or number of ads) to display instructional content for new device groups (for example, every 30 seconds or every 10 ads). |
| device-group-default-instruction-period-type | Byte value representing the default period type for new device groups. This field dictates how to interpret the value stored in the device-group-default-instruction-period field. Possible values are INSTRUCTION_PERIOD_TIME or INSTRUCTION_PERIOD_ADS. |
| device-group-default-instruction-url | String value representing the default URL for instructional content for new device groups. |

Device Tables

The device tables 68a, 68b, illustrated in Tables 2 and 3 below, store all of the configuration information for each system device and device group. Table 2 illustrates the Device database table 68a. This table stores all of the configuration information for each system device.

TABLE 2

Device Database Table Definition
DEVICE

| Field: | Description: |
|---|---|
| device-id | Integer value representing the device identifier. |
| device-ip-address | String value representing the device's IP address. |
| device-group-id | Integer value representing the device group identifier. |
| device-description | String value describing the device. |

Table 3 illustrates the Device-Group database table 68b. This table stores all of the configuration information for each device group.

TABLE 3

Device-Group Database Table Definition
DEVICE-GROUP

| Field: | Description: |
|---|---|
| device-group-id | Integer value representing the device group identifier. |
| device-group-description | String value describing the device group. |
| device-group-home-url | String value representing the start page URL for the device group. |
| device-group-idle-timeout | Long integer value representing the amount of idle time (in seconds) before an attract loop starts for this device group. |
| device-group-instruction-duration | Long integer value representing the number of seconds to display instructional content for the device group. |
| device-group-instruction-period | Long integer value representing how often (in number of seconds or number of ads) to display instructional content for the device group (for example, every 30 seconds or every 10 ads). |
| device-group-instruction-period-type | Byte value representing the period type for the device group. This field dictates how to interpret the value stored in the device-group-instruction-period field. Possible values are INSTRUCTION_PERIOD_TIME or INSTRUCTION_PERIOD_ADS. |
| device-group-instruction-url | String value representing the instructional content URL for the device group. |

Ad Group Tables

The ad group tables 70a–c, illustrated in Tables 4, 5 and 6 below, store all of the configuration information for each ad group. Table 4 illustrates the database table Nav-Device-Ad-Group 70a that maps a device group and navigational category to an ad group based on a specific time schedule.

TABLE 4

Nav-Device-Ad-Group Database Table Definition
NAV-DEVICE-AD-GROUP

| Field: | Description: |
|---|---|
| device-group-id | Integer value representing the device group identifier. |
| nav-cat-id | Integer value representing the navigational category identifier of the screen displayed (a value of zero indicates that the ad group has not been categorized -- only uncategorized ad groups will be shown in the attract loop). |
| ad-group-id | Long integer value uniquely identifying the ad group. |
| nav-device-ad-group-id | Integer value provided to allow the same ad group to be scheduled more than once for the same device group/category ID pair. |
| nav-device-ad-group-start-date | Date value representing the start date of when the ad group is eligible for display. |
| nav-device-ad-group-stop-date | Date value representing the stop date of when the ad group is eligible for display. |
| nav-device-ad-group-start-time | Time value representing the start time of when the ad group is eligible for display. |
| nav-device-ad-group-stop-time | Time value representing the stop time of when the ad group is eligible for display. |
| nav-device-ad-group-dow | Byte value bit mask representing which days of the week the ad group is eligible for display. |
| nav-device-ad-group-schedule-type | Byte value indicating which type of scheduling is used for the ad group. This field is used to indicate which ad group date/time fields should be used to determine the ad group's time schedule. This field is also used to indicate how to interpret the values of the appropriate ad group date/time fields. Possible values and a more detailed description of ad group scheduling are provided in Table 9, below. |

Table 5 illustrates the Ad-Group database table 70b. This table stores all of the configuration information for each ad group.

TABLE 5

Ad-Group Database Table Definition
AD-GROUP

| Field: | Description: |
|---|---|
| ad-group-id | Long integer value uniquely identifying the ad group. |
| ad-group-description | String value describing the ad group. |
| ad-group-default-duration | Long integer value specifying the number of seconds to display each ad in the ad group. This field can be overridden for each ad using the ad-language-duration field of the Ad-Language table (Table 8). |
| ad-group-start-type | Byte value specifying how the ad group should be initiated. Possible values are AD_GROUP_START (always start with the first ad in the group) or AD_GROUP_RESUME (always resume where ad group was last terminated if no other ad groups were displayed since the last time this ad group was displayed; otherwise start with the first ad in the group). |
| ad-group-order-type | Byte value indicating how the ads in the ad group should be ordered. Possible values are AD_GROUP_ORDER_EXPLICIT (always display ads in the order they were grouped) or AD_GROUP_ORDER_RANDOM (always display ads in a weighted random order as further specified by the ad-group-member-weight field of the Ad-Group-Member table, Table 6. |

Table 6 illustrates the Ad-Group-Member database table 70c. This table maps all of the ads to each ad group.

TABLE 6

Ad-Group-Member Database Table Definition
AD-GROUP-MEMBER

| Field: | Description: |
|---|---|
| ad-group-id | Long integer value uniquely identifying the ad group. |
| ad-group-member-index | Integer value specifying the sort index of the ad within the ad group. Although this field must be specified, its value is ignored if the ad-group-order-type field of the Ad-Group table (Table 5) is set to AD_GROUP_ORDER_RANDOM. |
| nav-cat-id | Integer value representing the navigational category identifier of the screen displayed (a value of zero indicates that the ad group has not been categorized -- only uncategorized ad groups will be shown in the attract loop). |
| ad-id | Long integer value specifying the unique identifier for the ad. |
| ad-group-member-weight | Byte value from 1 to 100 specifying the sort order weight of the ad within the ad group. The lowest weight is 1 while the highest weight is 100. This field is only required when the value of the ad-group-order-type field of the Ad-Group table (Table 5) is set to AD_GROUP_ORDER_RANDOM |

Ad Tables

The ad tables 72a, 72b, illustrated in Tables 7 and 8 below, store all of the configuration information for each ad. Table 7 illustrates the Ad database table 72a. This table stores all of the ads used in the present embodiment of the invention.

TABLE 7

Ad Database Table Definition
AD

| Field: | Description: |
|---|---|
| ad-id | Long integer value specifying the unique identifier for the ad. |
| ad-description | String value specifying a description for the ad. |

Table 8 illustrates the Ad-Language database table 72b. This table stores all of the language-specific configuration information about each ad.

TABLE 8

Ad-Language Database Table Definition
AD-LANGUAGE

| Field: | Description: |
|---|---|
| ad-id | Long integer value specifying the unique identifier for the ad. |
| Language-id | Integer value specifying the language that the ad was created for. |
| ad-language-duration | Long integer value specifying the amount of time (in seconds) to display the ad. If a value for this field is not specified, the ad will be displayed for the amount of time specified by the ad-group-default-duration field of the Ad-Group table (Table 5). |
| ad-language-url | String value specifying the URL of the ad itself. |
| ad-language-link-url | String value specifying the URL of the page that will be displayed if a consumer interacts with the ad. |

Returning to FIG. 1, the present embodiment of the invention comprises the following components:

In reply to:. Promotion Object 26: This COM object provides all of the services necessary for retrieving the appropriate ad groups to use within the user interface or attract loop.

II. Attract Loop Manager 44: This component is a Server-Side Include (SSI) file that provides all of the logic necessary for controlling the attract loop. It is invoked to start the attract loop.

III. Ad Manager 38: This component is an Active Server Page that collects tally data for each ad. It is invoked to display any ad.

IV. Ad Interaction Manager 40: This component is an Active Server Page that collects detailed data every time a consumer interacts with an ad. It is invoked whenever a customer interacts with any ad.

V. Idle Timer Manager 46: This component is a Server-Side Include (SSI) file that provides all of the logic necessary to manage the idle timer for each terminal. It is included in any page that may time out due to the terminal being idle. It is invoked to control the idle timer for any terminal in the system.

These components are described in greater detail immediately below.

I. Promotion Object

The promotion object 26 is an in-process COM object that provides all of the services necessary for retrieving the appropriate ad groups for use within the user interface or an attract loop. The promotion object supports both free- and apartment-model threading and is therefore completely thread-safe. The promotion object includes a promotion interface 48 that provides the following services: (A) retrieving the idle timeout value for a specific in-store terminal; (B) retrieving the instructional content information for a specific in-store terminal, including the instructional content uniform resource locator (URL), the duration to be displayed, and how often to be displayed; and (C) retrieving the appropriate ad group to be displayed for a specific in-store terminal device based on a navigational category identifier, the current date and time, and the current language. Each of these functions is explained more fully immediately below.

A. Retrieving the Idle Timeout Value

When the promotion object 26 is invoked to retrieve the idle timeout value for a given in-store terminal, the idle timeout value is returned as follows: First the in-store terminal's address, passed in from the caller, is looked up in the Device table 68a to find the terminal's group identifier device-group-id. The terminal's group identifier is used to perform a database lookup in the Device-Group table 68b to find the idle timeout value device-group-idle-timeout.

B. Retrieving the Instructional Content

When the promotion object 26 is invoked to retrieve the instructional content information for a given in-store terminal, the object returns the URL for the instructional content, the duration to display the instructional content, the display period, i.e., how often the instructional content should be displayed, and an indication as to how the display period should be interpreted, i.e., time-based or ad-based (for example, every 60 seconds or every 10 ads).

This operation is performed as follows: First, the device group for the terminal is found by looking up the device's address in the Device table 68a to find the device's group identifier device-group-id. Then, instructional content information is retrieved by using the device's group identifier to perform a database look-up in the Device-Group table 68b to find (1) the instructional content URL device-group-instruction-url, (2) the duration device-group-instruction-duration, (3) the display period device-group-instruction-period, and (4) the display period type device-group-instruction-period-type.

C. Retrieving the Appropriate Ad Group

The promotion object also provides a service that callers can use to retrieve the appropriate ad group to display on a specific in-store terminal. Finding the appropriate ad group to display is based on the following criteria: (1) the device identifier, i.e., the ID of the terminal making the request; (2) the navigational category identifier, i.e., the Category ID of the screen being displayed to the consumer; and (3) the language identifier, i.e., the ID of the language currently being displayed.

Each ad group is assigned a navigational category identifier. Those with a value of zero are considered uncategorized, while those with a non-zero value are considered categorized. In the presently preferred embodiment, attract loops consist of only uncategorized ad groups. Therefore, a navigational category identifier of zero is used to retrieve ad groups for the attract loop. On the other hand, ad groups can be displayed during non-idle times as part of the user interface. In this case, both categorized and uncategorized ad groups are eligible for display. Therefore, a non-zero navigational category identifier is used to retrieve the ad groups matching that category. In addition, the promotion object returns all valid uncategorized ad groups automatically.

Figure 5:
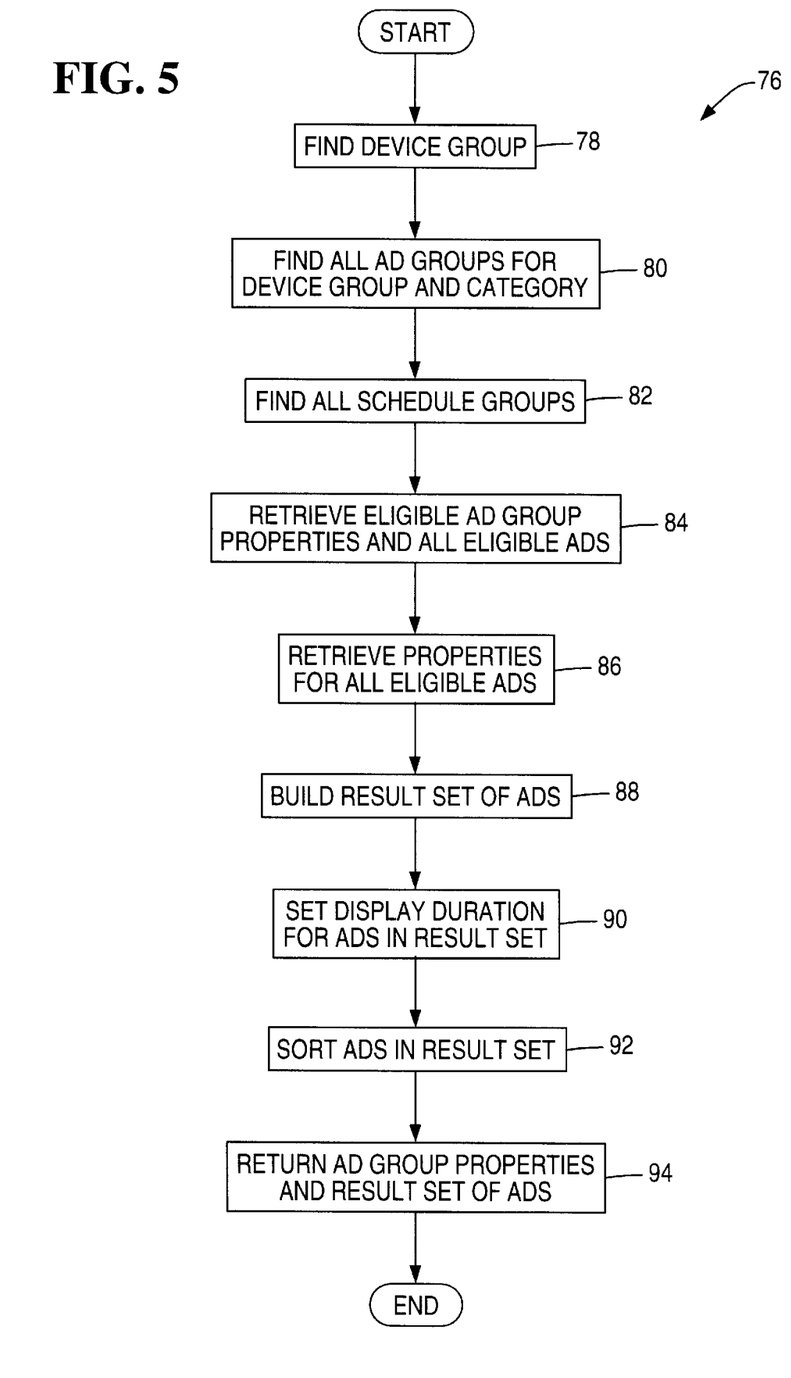
FIG. 5 is a diagram of a method according to the present invention for retrieving an appropriate ad group for display on a given in-store terminal.

When the promotion object 26 is invoked to retrieve the appropriate ad group for display on a given in-store terminal, the object performs the task using a given navigational category identifier, the current date and time, and the current language. FIG. 5 is a flowchart of the method 76 used by the promotion object 26. The method includes the following steps:

1. Find Device Group (Step 78): First, the promotion object finds the device group by looking up the in-store terminal's address, passed in from the caller, in the Device table 68a to find the in-store terminal's group identifier device-group-id.

2. Find All Ad Groups for the Device Group and Category (Step 80): Second, the promotion object finds all ad groups for the device group and category by using the device's group identifier and the navigational category identifier, passed in from the caller, to query the Nav-Device-Ad-Group table 70a to find all of the ad groups ad-group-id with matching device group identifiers and navigational category identifiers nav-cat-id. If the navigational category identifier passed in is non-zero (ad groups are being requested for display with the user interface), the promotion object queries the Nav-Device-Ad-Group table 70a for all of the ad groups ad-group-id with matching device group identifiers and a navigational category identifier nav-cat-id of zero (uncategorized ad groups).

3. Find All Scheduled Groups (Step 82): Next, the promotion object finds all scheduled ad groups by using the current system date and time, find all of the ad groups from Step 2 whose time schedules make them eligible for display. This is done by comparing the current system date and time against each ad group's: (a) start date nav-device-ad-group-start-date; (b) start time nav-device-ad-group-start-time; (c) stop date nav-device-ad-group-stop-date; (d) stop time nav-device-ad-group-stop-time; (e) days of the week that the ad group is eligible to be displayed nav-device-ad-group-dow; and (f) ad group's schedule type nav-device-ad-group-schedule-type. If no ad groups are currently scheduled, the promotion object simply returns the number of seconds until the next group of ads is due to start.

4. Retrieve Eligible Ad Group Properties and All Eligible Ads (Step 84): For each of the eligible ad groups found in Step 3, the promotion object uses the ad group's identifier ad-group-id as the key to query the Ad-Group table 70b for the ad group's default duration ad-group-default-duration, start type ad-group-start-type, and order type ad-group-order-type. In addition, use the same ad group identifier ad-group-id as the key to query the Ad-Group-Member 70c table for all of the ads in the group ad-id, their explicit sort indices ad-group-member-index, their navigational category identifiers nav-cat-id, and their random order weights ad-group-member-weight.

5. Retrieve Properties for All Eligible Ads (Step 86): For each ad in each eligible ad group found in Step 4, the promotion object uses each ad's identifier ad-id and current language identifier, passed in from the caller, as the key to query the Ad-Language 72b table for the ad's display duration ad-language-duration, content URL ad-language-url, and link URL adlanguage-link-url. Since each ad may include versions in different languages, eligible ads in the proper language are retrieved using the following logic, as defined by the Microsoft Win32 Applications Programming Interface (API): (a) look for a version of the ad with an exact language match; (b) look for a version of the ad with a close language match; (c) look for a version of the ad that is language neutral; (d) look for an English version of the ad; (e) use any version of the ad.

6. Build Result Set of Ads (Step 88): Using all of the information obtained in Steps 4 and 5, construct a result set of ads that contains each ad's: (a) ad group identifier ad-group-id; (b) sort index ad-group-member-index; (c) navigational category identifier nav-cat-id; (d) ad identifier ad-id; (e) random order weight ad-group-member-weight; (f) display duration ad-language-duration; (g) content URL ad-language-url; and (h) link URL ad-language-link-url.

7. Set Display Duration for Ads in Result Set (Step 90): For each ad in the result set built in Step 6, the promotion object uses the ad group's default duration ad-group-default-duration to fill in the ad's display duration ad-language-duration if its value is NULL. Each ad having a NULL display duration inherits its display duration from the ad group that includes it.

8. Sort Ads in Result Set (Step 92): Sort the final ad result set from Step 7. The result set is sorted differently depending on whether it is being used as part of the user interface (navigational category identifier passed in by caller is non-zero) or as an attract loop (navigational category identifier passed in by caller is zero):

a. If the result set is being used as part of the user interface, the promotion object sorts the result set first in ascending order by navigational category identifier nav-cat-id and second in ascending order by ad identifier ad-id.

b. If the result set is being used as an attract loop, it is sorted differently depending on the ad group's sort order type ad-group-order-type. (1) If the sort order type is random, AD_GROUP_ORDER_RANDOM, the result set is not sorted, as this is left to the Attract Loop Manager SSI. (2) If the sort order type is explicit, AD_GROUP_ORDER_EXPLICIT, the result set is sorted first in ascending order by ad group identifier ad-group-id and second in ascending order by each ad's sort index ad-group-member-index.

If more than one eligible ad group was found in Step 3 with different sort order types ad-group-order-type, the overall sort order type used is explicit, AD_GROUP_ORDER_EXPLICIT. In addition, if more than one eligible ad group was found in Step 3 with different start types ad-group-start-type, the overall start type used is "start with first ad," AD_GROUP_START. Therefore, in either case, all ads are sorted explicitly and are displayed starting with the first ad in the sequence. Finally, all ad groups specified with a random sort order type ad-group-order-type set to AD_GROUP_ORDER_RANDOM are always started from the first ad in the sequence.

9. Return Ad Group Properties and Result Set of Ads (Step 94): Return the sorted result set of ads from Step 8, the overall ad group start type ad-group-start-type, the overall ad group sort order type ad-group-order-type, and the number of seconds until the current group of ads is due to expire.

This expiration duration will be computed based on the current system date and time as well as the earliest expiration date and time of all of the eligible ad groups found in Step 3.

D. Ad Group Scheduling

Ad groups are eligible to be displayed only according to their specified time schedules. The promotion object can examine the start date, stop date, start time, stop time, and days of the week mask for each ad group depending the scheduling option specified for that ad group. All of the supported ad group scheduling options for the system are listed in Table 1 below. All values are mutually exclusive.

B. Initiating the Attract Loop

If desired, the Attract Loop Manager 44 can be configured such that a given attract loop is always started from its first ad. However, if it is desired that a given attract loop should always be started from where it last left off, the Attract Loop Manager 44 starts the attract loop from where it left off in its previous run, provided that the ad that was last displayed has the same ad group identifier, ad identifier, and index value within the attract loop.

The information that maintains where the attract loop last left off is stored in three ASP Session variables. Since these variables are given session scope, all three variables are maintained for each in-store terminal. These ASP Session

TABLE 9

Ad Group Scheduling Options

| Scheduling Option | Description | Example |
| --- | --- | --- |
| DATE_RANGE | Display ad group anytime between two specified dates. | Jan. 1, 1997–Jan. 7, 1997 anytime |
| TIME_RANGE | Display ad group between two specified times (not crossing midnight) every day. | 2:00 pm–5:00 pm every day |
| DATE_TIME_RANGE | Display ad group between two specified times (not crossing midnight) during the given date range. | 2:00 pm–5:00 pm every day from Jan. 1, 1997–Jan. 7, 1997 |
| DATE_TIME_SPAN | Display ad group between two specified dates/times. | Jan. 1, 1997 at 2:00 pm–Jan. 7, 1997 at 5:00 pm |
| DAYS_OF_WEEK | Display ad group anytime on specified days of the week. | Anytime on Sundays, Tuesdays, Fridays |
| DATE_DOW_RANGE | Display ad group anytime on specified days of the week within a specified date range. | Anytime on Sundays, Tuesdays, Fridays from Jan. 1, 1997–Jan. 7, 1997 |
| DOW_TIME_RANGE | Display ad group between two specified times (not crossing midnight) on specified days of the week. | 2:00 pm–5:00 pm only on Sundays, Tuesdays, Fridays |
| DATE_DOW_TIME_RANGE | Display ad group between two specified times (not crossing midnight) on specified days of the week within a specified date range. | 2:00 pm–5:00 pm only on Sundays, Tuesdays, Fridays from Jan. 1, 1997– Jan. 7, 1997 |

II. Attract Loop Manager

The Attract Loop Manager 44 is an SSI file that can be included as part of any Active Server Page. It is solely responsible for controlling a device's attract loop. The Attract Loop Manager SSI consists of server-side VBScript to initialize the attract loop for a given device. This server-side script is used to dynamically generate client-side JavaScript that is eventually executed by the system's platform Web browser. The resulting client-side JavaScript contains all of the logic necessary to control the attract loop.

A. Building the Attract Loop

When the Attract Loop Manager 44 is requested, it invokes the promotion object 26 with a navigational category identifier of zero to retrieve all of the eligible ads contained in uncategorized ad groups that are used in the attract loop.

The eligible ads returned by the promotion object 26 are used to initialize internal Ad objects and a single internal Attract Loop object. These objects are client-side JavaScript objects maintained by the Attract Loop Manager 44. They are used to easily access the attributes of each ad as well as the attributes of the attract loop as a whole.

If the promotion object 26 returns a value indicating that there are no ad groups currently scheduled, then the Attract Loop Manager 44 has no ads to display. In this case, the Attract Loop Manager 44 displays the instructional content for the given in-store terminal 14.

variables maintained by the Attract Loop Manager are: (a) AttractLoopAdGroupId, the ad group identifier of the last ad displayed in an attract loop; (b) AttractLoopAdId, the identifier of the last ad displayed in an attract loop; and (c) AttractLoopAdIndex, the index within the attract loop of the last ad displayed in an attract loop.

If the attract loop is to be started from where it last left off, the Attract Loop Manager looks in the attract loop for the ad whose index matches that of the AttractLoopAdIndex ASP Session variable. It then compares that ad's ad identifier and ad group identifier against the values of the AttractLoopAdId and AttractLoopAdGroupId ASP Session variables, respectively. If there is a match, the Attract Loop Manager assumes that the attract loop is identical to the last attract loop to run on the given in-store terminal and starts displaying the attract loop with the ad that follows the matching ad.

C. Retrieving the Instructional Content Information

In addition to its other responsibilities, the Attract Loop Manager 44 is responsible for displaying system instructional content automatically as part of any attract loop or when there are no scheduled ad groups.

The Attract Loop Manager 44 invokes the promotion object 26 to retrieve all of the attributes of the instructional content for a given in-store terminal. These attributes include: (1) instruction duration, i.e., how long to display the instructional content; (2) instruction period, i.e., how often to display the instructional content; (3) instruction period type, i.e., how to interpret the instruction period; and (4) instruction URL, i.e., a reference to the instructional content itself.

As the attract loop is displayed, the Attract Loop Manager 44 keeps track of the total number of ads that have been displayed as well as the total amount of elapsed time since the attract loop started. The Attract Loop Manager 44 displays the instruction content (specified by the instruction URL) for a specific amount of time (specified by the instruction duration) every X number of ads or every Y number of seconds (specified by the instruction period and period type) automatically as part of the attract loop.

D. Displaying the Attract Loop

If an attract loop has been ordered explicitly, the Attract Loop Manager 44 simply cycles through each ad in the attract loop in sequence. However, if an attract loop has been ordered randomly, the Attract Loop Manager uses an internal algorithm to randomly display the ads based on each ad's weighting factor.

The Attract Loop Manager's client-side JavaScript uses two timeouts maintained via the Web browser's document object model. One of the timeouts controls the attract loop's ad rotation. When this timer expires, the next ad in the sequence is displayed. The other timeout detects when the entire attract loop expires. When this timer expires, the Attract Loop Manager 44 issues another request to the Web server for itself. This self-request causes the Attract Loop Manager 44 to be re-initialized with a new attract loop.

The Attract Loop Manager 44 maintains an internal floating frame (implemented using the <IFRAME> HTML tag) to display all of its ad content. The Attract Loop Manager 44 requests that all ad content be sent to this floating frame for rendering. The floating frame will occupy 100 percent of the Attract Loop Manager's visual area so that only the ad content is visible to the consumer.

The Attract Loop Manager 44 maintains one internal JavaScript variable that stores the link URL for the ad that is currently being displayed. This internal variable is updated by the Attract Loop Manager 44 each time a new ad is displayed. It can be accessed by any client-side scripting code outside of the Attract Loop Manager 44 by invoking the appropriate JavaScript access function. Its value should be passed to the Ad Interaction Manager Active Server Page 40 whenever a consumer interacts with a running ad to ensure that the proper data is collected about each ad interaction within the attract loop. The Attract Loop Manager 44 provides a JavaScript function to perform this task.

The Attract Loop Manager 42 invokes the Ad Manager Active Server Page 38 each time a new ad is to be displayed. This ensures that the proper data is collected about the display of each ad in the attract loop, and that the Attract Loop Manager's three ASP Session variables are updated. The Attract Loop Manager 44 invokes the Data Collection and Analysis module 32 to increment a tally for each attract loop initiation.

III. Ad Manager

The Ad Manager 38 is an Active Server Page that contains a small amount of server-side VBScript code. It is responsible for collecting data about each ad that is displayed. It invokes the Data Collection and Analysis module 32 to perform this task. The Ad Manager 38 is also responsible for updating the information about the last ad displayed as part of an attract loop. The Ad Manager 38 should be invoked whenever any of the following scenarios occurs: (a) Non-Ad to Ad Transition, i.e., a non-ad is currently being displayed and an ad is to be displayed (for example, starting the attract loop); (b) Ad to Non-Ad Transition, i.e., an ad is currently being displayed and a non-ad is to be displayed (for example, terminating the attract loop); or (c) Ad to Ad Transition, i.e., an ad is currently being displayed and another ad is to be displayed (for example, attract loop ad rotation).

The Ad Manager 38 accepts at most six parameters depending upon the scenario in which it is invoked. The six Ad Manager parameters are described as follows along with the scenarios in which each must be specified: (1) LastAdGroupId, i.e., the ad group identifier for the ad that has just completed being displayed (should be passed in for "ad to non-ad transitions" and "ad to ad transitions" only); (2) LastAdId, i.e., the ad identifier for the ad that has just completed being displayed (should be passed in for "ad to non-ad transitions" and "ad to ad transitions" only); (3) AdGroupId, i.e., the ad group identifier for the ad that is to be displayed (should be passed in for "non-ad to ad transitions" and "ad to ad transitions" only); (4) AdId, i.e., the ad identifier for the ad that is to be displayed (should be passed in for "non-ad to ad transitions" and "ad to ad transitions" only); (5) AttractLoopAdIndex, i.e., the index of the ad to be displayed within an attract loop (should only be passed in if the ad is being displayed as part of an attract loop); and (6) ContentUrl, i.e., the URL of the content (ad or non-ad) to be displayed (should always be passed in).

The Ad Manager 38 maintains three ASP Session variables of its own. They are described as follows: (1) CurrentAdGroupId, i.e., the ad group identifier of the ad to be displayed; (2) CurrentAdId, i.e., the identifier of the ad to be displayed; and (3) CurrentAdStartTime, the start time of the ad to be displayed.

When the Ad Manager 38 is invoked:

1. It compares the LastAdGroupId and LastAdId parameters (if passed in) against the CurrentAdGroupId and CurrentAdId ASP Session variables.

2. If they match, the Ad Manager 38 assumes that the ad specified by those two parameters has terminated its display and therefore its total display time tally should be updated.

3. It computes the total display time by taking the difference between the current system time and the value of the CurrentAdStartTime ASP Session variable.

4. It then invokes the Data Collection and Analysis module 32 to update the tally.

5. It also invokes the Data Collection and Analysis 32 module to update the total device idle time tally if the terminated ad is displayed as part of an attract loop.

6. After the appropriate processing is completed for the last ad displayed, the Ad Manager 38 replaces the CurrentAdGroupId and CurrentAdId ASP Session variables with the values of the AdGroupId and AdId parameters (if passed in) and replaces the value of the CurrentAdStartTime ASP Session variable with the current system time.

7. If the caller passed in the AttractLoopAdIndex parameter, the Ad Manager 38 assumes that the ad to be displayed is part of an attract loop and updates the Attract Loop Manager's AttractLoopAdGroupId, AttractLoopAdId, and AttractLoopAdIndex ASP Session variables with the values of the AdGroupId, AdId, and AttractLoopAdIndex parameters respectively.

8. Finally, in any case, the Ad Manager issues an HTTP redirect response to the URL specified by the ContentUrl parameter (which must always be specified). This URL can be a reference to any ad or non-ad content.

IV. Ad Interaction Manager

The Ad Interaction Manager 40 is an Active Server Page that contains a small amount of server-side VBScript code.

It is responsible for collecting data about every consumer interaction with an ad that is being displayed on a retail self-service terminal. To perform this task, it invokes the Data Collection and Analysis module 32.

The Ad Interaction Manager 40 should be invoked whenever a consumer interacts with an ad. This can occur when the consumer touches an ad while it is being displayed as part of the user interface or when the consumer touches one of the navigational buttons while an ad is being displayed as part of an attract loop.

The Ad Interaction Manager 40 accepts a single parameter that is the link URL for the ad being displayed when a consumer interacts with it.

When the Ad Interaction Manager 40 is invoked:

1. It increments the current ad's interaction tally by invoking the Data Collection and Analysis module 32 with the CurrentAdGroupId and CurrentAdId ASP Session variables maintained by the Ad Manager 38.

2. It also invokes the Data Collection and Analysis module 32 to log a detailed transaction using the information about the interaction.

3. Finally, the Ad Interaction Manager 40 issues an HTTP redirect response to the URL specified by the link URL parameter (passed in from the caller).

V. Idle Timer Manager

The Idle Timer Manager 46 is an SSI file that should be included as part of any Active Server Page that may be subsequently preempted by an attract loop. It is solely responsible for controlling a terminal's idle timer. The Idle Timer Manager SSI 46 consists of some server-side VBScript to initialize the idle timer for a given terminal, or other device. This server-side script is used to dynamically generate client-side JavaScript that is eventually executed by the platform Web browser. The resulting client-side JavaScript contains all of the logic necessary to control the idle timer.

The Idle Timer Manager SSI client-side JavaScript utilizes a timeout maintained via the Web browser's document object model. This timer is used to keep track how long a device has been idle. The timer is initialized from the idle timeout value for the specific device. This value is retrieved by invoking the promotion object. When the timer expires, the Idle Timer Manager issues an HTTP request for the Active Server Page containing Attract Loop Manager SSI to start the attract loop.

The Idle Timer Manager SSI 46 also maintains some JavaScript convenience functions that can be used by client-side scripting outside of the Idle Timer Manager 46 to manipulate the idle timer. These convenience functions include starting, stopping, and restarting the idle timer as well as a function for starting the attract loop.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A product promotion display system, comprising:
a server computer hosting a network of retail self-service terminals located throughout a store, each terminal having a display for displaying custom interactive advertising content promoting in-store products;
a product promotion database accessible by the server computer, the product promotion database containing data to be used in assembling advertisements and product promotion information to be displayed on one or more of the terminals, the product promotion database containing a specification selectably assigning each terminal to one or more device groups, and defining groups of advertisements and product information for display on one or more of the device groups of terminals;
a product promotion software object executed by the server computer, the product promotion software object having access to the database in order to retrieve data therefrom to be used in assembling advertisements and product promotion information to be displayed on one or more of the terminals; and
a user interface connected to the terminals and to the promotion software object, the user interface causing the assembled advertisements and product promotion information to be displayed on one or more defined groups of terminals.

2. The system of claim 1, wherein the product promotion database contains definitions of groups of advertisements that are to be displayed together.

3. The system of claim 2, wherein the product promotion database contains a specification of a time schedule for the display of each ad group.

4. The system of claim 2, wherein the product promotion database contains a specification of an ordering for the display of advertisements within each ad group, either according to an explicit ordering or according to a random order algorithm.

5. The system of claim 2, wherein each ad group can be configured to run independently on any terminal or group of terminals, and wherein each terminal or group of terminals can be configured to run any number of different ad groups, thereby enabling a retailer to define advertising content that should be displayed on any terminal or group of related terminals.

6. The system of claim 2, wherein advertisements are maintained independently, thereby allowing advertisements to be created independently and subsequently grouped together to form ad groups.

7. The system of claim 2, wherein the product promotion database comprises a set of predefined ad groups.

8. The system of claim 3, wherein advertising content is stored as regular files on an internet information server.

9. The system of claim 8, wherein the system is Web-based, with each of the terminals being provided with Web browser software and with the server computer being provided with Web server software.

10. The system of claim 9, wherein the user interface comprises active server pages, such that when the browser software at a terminal requests an active server page, the Web server software used by the server computer generates a page with HTML code and sends it back to the browser at the terminal for display, the page containing an advertisement.

11. The system of claim 10, wherein the user interface comprises:
an active server page with an attract loop manager server-side include file that provides logic for controlling an attract loop, comprising a sequence of advertisements, instructions, or other content that is displayed on a terminal when it is idle in order to attract a customer to use the terminal;
an ad manager active server page for collecting tally data for each advertisement;
an ad interaction manager active server page that collects data ever time a customer interacts with an advertisement; and an active server page with an idle time manager server-side include file that provides logic to manage an idle time for each terminal, after which the attract loop is displayed.

12. The system of claim 11, further comprising a product promotion interface connected between the product promotion software object and the user interface for:

retrieving an idle timeout value for a specific terminal;

retrieving instructional content information for a specific terminal; and retrieving an appropriate ad group to be displayed on a specific terminal.

13. The system of claim 11, further comprising a data collection and analysis module accessible by the product promotion software object for collecting and analyzing data related to the advertisements and product promotion information displayed on the terminals.

14. The system of claim 13, wherein the data the is collected and analyzed includes data relating to:

how long each advertisement has been displayed within a specific date/time slot;

the number of times each advertisement has been displayed within a specific date/time slot; and the number of times a customer interacts with each advertisement.

15. The system of claim 11, wherein each terminal includes a touch-screen display for receiving inputs from, and displaying outputs, to a customer at the terminal, and wherein the attract loop is displayed on the touch-screen display.

16. The system of claim 15, wherein the attract loop is displayed on two distinct regions of the touch-screen display, a content region and a navigation region.

17. The system of claim 15, wherein the attract loop at a terminal is terminated by a customer touching the touch-screen display at that terminal.

18. The system of claim 17, wherein when the attract loop has been terminated at a terminal by a customer, the terminal displays a default home page.

19. The system of claim 17, wherein when the attract loop has been terminated at a terminal by a customer, the terminal displays a screen related to a choice selected by the customer on the terminal's touch-screen display.

20. A method for displaying product promotion information, comprising the following steps:

providing a server computer and a network of retail self-service terminals located throughout a store, each terminal having a display for displaying custom interactive advertising content promoting in-store products, said interactive advertising content allowing customers to affect the display of advertising content;

providing a product promotion database accessible by the server computer, the database containing data to be used in assembling advertisements and product promotion information to be displayed on one or more of the terminals, the product promotion database containing a specification selectably assigning each terminal to one or more device groups, and defining groups of advertisements and product information for display on one or more of the device groups of terminals;

retrieving data from the database and using the data to assemble advertisements product promotion information to be displayed on one or more of the terminals; and causing the assembled advertisements and product promotion information to be displayed on one or more defined groups of terminals.

21. The method of claim 20, comprising the further step of:

defining ad groups comprising related advertisements to be displayed together.

22. The method of claim 21, comprising the further step of:

specifying a time schedule for the display of ad groups.

23. The method of claim 21, comprising the further step of:

specifying an ordering for the display of advertisements within each ad group, either according to an explicit ordering or according to a random order algorithm.

24. The system of claim 22, comprising the further step of:

storing advertising content as regular files on an internet information server.

25. The method of claim 24, comprising the further step of:

providing each of the terminals with Web browser software and providing the server computer with Web server software.

26. The method of claim 25, comprising the further step of:

providing a user interface comprising active server pages, such that when the browser software at a terminal requests an active server page, the Web server software used by the server computer generates a page with HTML code and sends it back to the browser at the terminal for display, the page containing an advertisement.

27. The method of claim 20, comprising the further step of:

collecting and analyzing data related to the advertisements and product promotion information displayed on the terminals.

28. The method of claim 20, comprising the further step of:

defining an attract loop, comprising a sequence of advertisements, instructions, or other content that is displayed on a terminal when it is idle in order to attract a customer to use the terminal.

29. A product promotion display system, comprising:

a server computer hosting a network of retail self-service terminals located throughout a store, each terminal having a display for displaying custom interactive advertising content promoting in-store products;

a product promotion database accessible by the server computer, the product promotion database containing data to be used in assembling advertisements and product promotion information to be displayed on one or more of the terminals, the product promotion database containing a specification selectably assigning each terminal to one or more device groups, and defining groups of advertisements and product information for display on one or more of the device groups of terminals;

a product promotion software object executed by the server computer, the product promotion software object having access to the database in order to retrieve data therefrom to be used in assembling advertisements and product promotion information to be displayed on one or more of the terminals; and a user interface connected to the terminals and to the promotion software object, the user interface causing the assembled advertisements and product promotion information to be displayed on one or more defined groups of terminals, the server computer running a promotion software object including a promotion object that performs the following functions:

finding a device group for an in-store terminal by looking up the in-store terminal's address, passed in from the terminal, in a device table to find the in-store terminal's group identifier;

finding all ad groups for the device group by using the device's group identifier and a navigational category identifier, passed in from the terminal, to query a navigational device ad group table to find all ad groups with matching device group identifiers and navigational category identifiers;

finding all scheduled ad groups by using a current system date and time to find all ad groups with time schedules making them eligible for display;

for each eligible ad group, using the ad group's identifier as a key to query an ad group table for the ad group's duration, start type, and order type, and further using the ad group identifier as a key to query an ad group member table for ad identifiers for all ads in the group, their explicit sort indices, their navigational category identifiers, and their random order weights;

for each ad in each eligible ad group, using each ad identifier and current language identifier, passed in from the terminal, as a key to query an ad-language table for the ad's display duration, content URL, and link URL;

constructing a result set of ads containing each ad's ad group identifier, sort index, navigational category identifier, random order weight, display duration, content URL and link URL;

for each ad in each result set, using the ad group's default duration ad group default duration to fill in the ad's display duration if its value is null;

sorting the final result set;

returning the sorted result set, the overall ad group start type, the overall ad group sort order type, and a number of seconds until a current group of ads is due to expire.

30. A method for displaying product promotions, comprising:

finding a device group for an in-store terminal by looking up the in-store terminal's address, passed in from the terminal, in a device table to find the in-store terminal's group identifier;

finding all ad groups for the device group by using the device's group identifier and a navigational category identifier, passed in from the terminal, to query a navigational device ad group table to find all ad groups with matching device group identifiers and navigational category identifiers;

finding all scheduled ad groups by using a current system date and time to find all ad groups with time schedules making them eligible for display;

for each eligible ad group, using the ad group's identifier as a key to query an ad group table for the ad group's duration, start type, and order type, and further using the ad group identifier as a key to query an ad group member table for ad identifiers for all ads in the group, their explicit sort indices, their navigational category identifiers, and their random order weights;

for each ad in each eligible ad group, using each ad identifier and current language identifier, passed in from the terminal, as a key to query an ad-language table for the ad's display duration, content URL, and link URL;

constructing a result set of ads containing each ad's ad group identifier, sort index, navigational category identifier, random order weight, display duration, content URL and link URL;

for each ad in each result set, using the ad group's default duration ad group default duration to fill in the ad's display duration if its value is null;

sorting the final result set;

returning the sorted result set, the overall ad group start type, the overall ad group sort order type, and a number of seconds until a current group of ads is due to expire.

* * * * *